Oct. 18, 1927.  1,645,800
C. M. COLE ET AL
LIQUID LEVEL GAUGE
Filed March 20, 1923 2 Sheets-Sheet 1
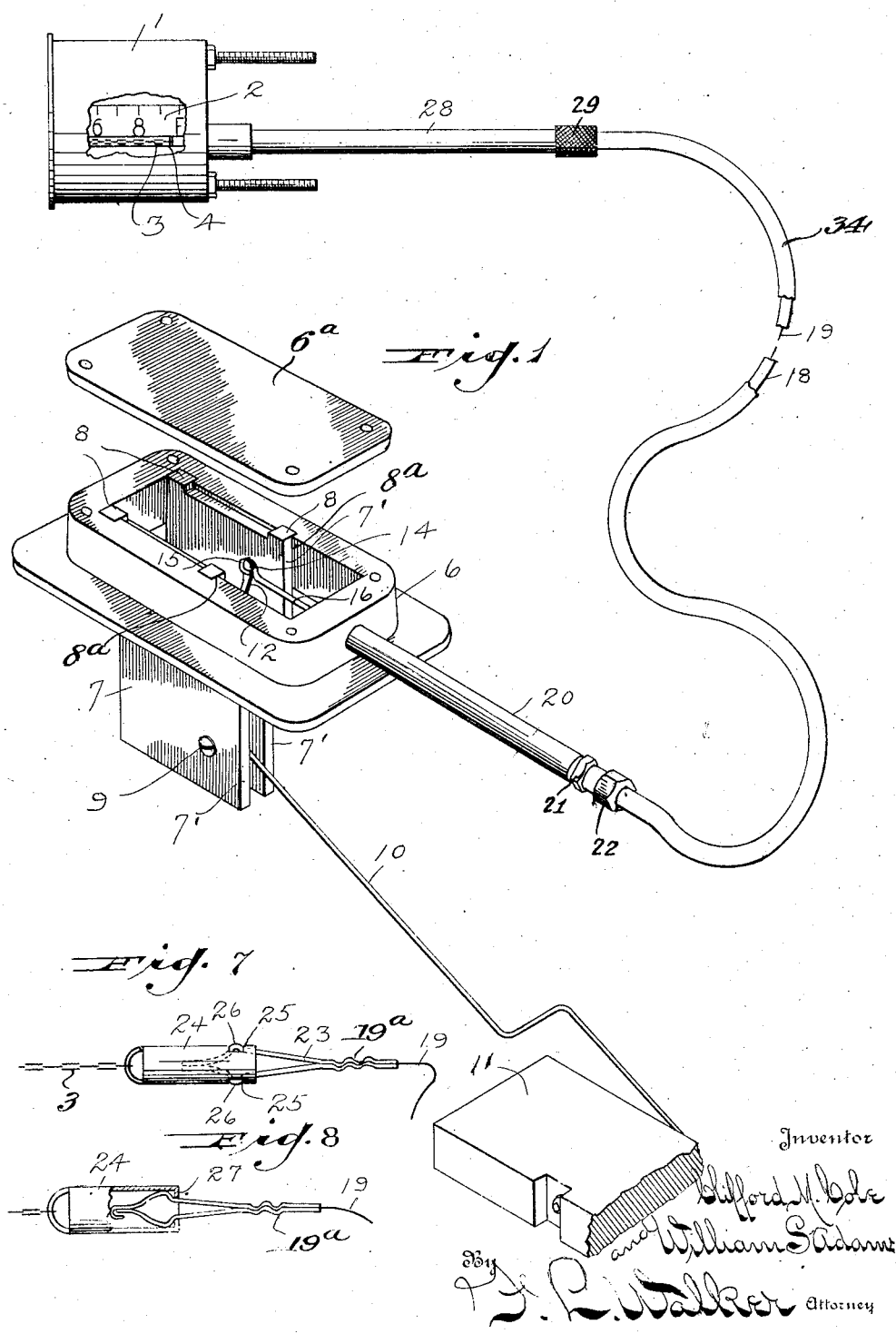

Oct. 18, 1927.
C. M. COLE ET AL
1,645,800
LIQUID LEVEL GAUGE
Filed March 20, 1923
2 Sheets-Sheet 2
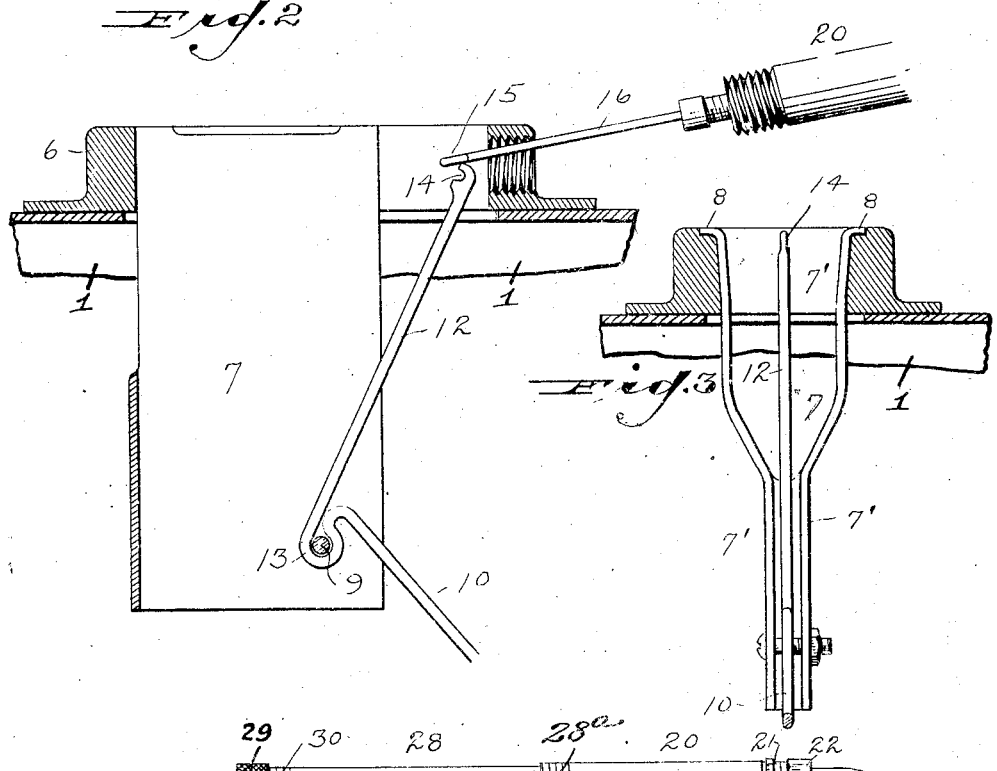
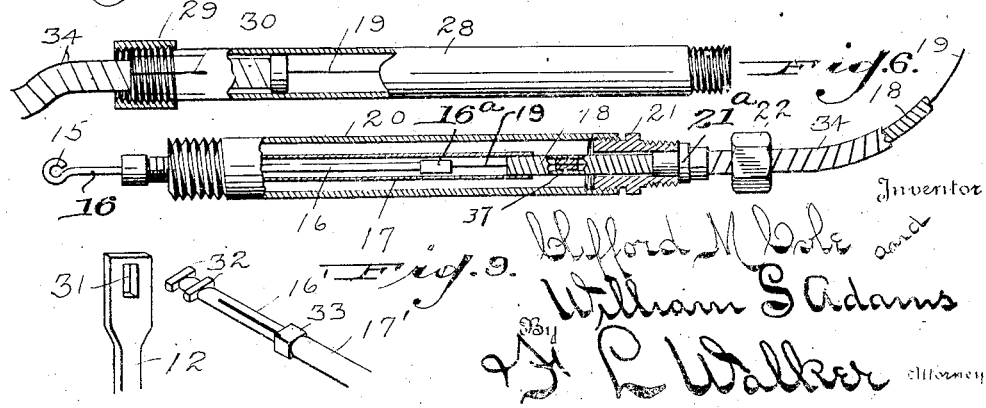

Patented Oct. 18, 1927.  1,645,800

UNITED STATES PATENT OFFICE.

CLIFFORD M. COLE, OF LOS ANGELES, AND WILLIAM S. ADAMS, OF SAN DIEGO, CALIFORNIA, ASSIGNORS TO THE GROLAN MANUFACTURING COMPANY, OF DAYTON, OHIO, A CORPORATION OF DELAWARE.

LIQUID-LEVEL GAUGE.

Application filed March 20, 1923. Serial No. 626,250.

Our invention relates to measuring instruments and more particularly to a liquid level gauge of the float operated type, wherein a distantly located indicator is controlled by the rise and fall of the float within a tank, the fluctuations of which are transmitted to the indicator by the to and fro movement of an intermediate flexible motion transmitting wire or strand.

While the invention is particularly applicable to motor vehicles for indicating upon the dash or cowl board or elsewhere within the normal range of view of the driver, the quantity of fuel remaining in the supply tank or reservoir which may be located at the rear of the machine or in other positions beyond the range of view of the driver, the invention is not limited to this application alone. It may be utilized in stationary installations for measuring and indicating the quantity of contents of stationary supply tanks or may be utilized as an ullage device for measuring the wantage or deficiency of casks or other containers and for calibrating receptacles.

The present invention contemplates a construction wherein the float controlled actuator, the distantly located indicator and the intermediate motion transmitting devices are readily disengageable one from the other for storage purposes, and for shipping, but are so arranged that when interconnected for practical operation cannot become accidentally disengaged. To this end the invention involves an approved form of tank unit having a detachable hanger for the oscillatory float arm. The intermediate motion transmitting member is provided with a substantially inflexible extension for engagement with the operating arm of the tank unit or float actuator, which extension is provided with a guide section engageable with the tank unit mounting, in such relation that the extension of the transmission element cannot be engaged or disengaged without first disconnecting the guide element and turning the part to an abnormal relation. Inasmuch as the intermediate reciprocatory motion transmitting strand or wire is usually quite fine and delicate in character, subject to kinks, or distortion in shipping and installation, which distortions or kinks interfere with its free movement, the present invention involves the protection of such elements by providing for the complete enclosure of such element within its protective guide tube or housing when disconnected from the float actuator and indicator.

The object of the present invention is to simplify the structure as well as the means and mode of operation of such float controlled liquid level gauges, whereby they will not only be cheapened in construction, but will be more efficient in use, capable of being easily and quickly installed, uniform in operation, automatic in action, and unlikely to get out of repair.

A further object of the invention is to provide in such a float controlled liquid level gauge, take down features, whereby the gauge may be readily separated into independent units, easily connected and disconnected one from the other.

A further object of the invention is to provide a detachable connection between the float controlled actuator and the reciprocatory transmission element, which will permit the disengagement of such parts only when adjusted to abnormal relation in conjunction with guide means fixedly mounted to prevent accidental disengagement of the parts when in use.

A further object of the invention is to provide a closure or interconnecting end upon the tubular guide tube for the transmission element, by which the element may be protected against injury.

A further object of the invention is to provide an improved safety connection between the transmission element and the indicator head, the resistance of which is sufficient to meet all normal requirements but which will yield under abnormal strain to prevent injury to the operating parts.

A further object is to provide an improved form of detachable hanger member for the tank unit.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein is shown the preferred, but obviously not necessarily the only form of embodiment of the invention, Fig. 1 is a perspective view of an assembled gauge mechanism, the cover of the tank unit being removed. Fig. 2 is a longitudinal sectional view of the hanger and mounting showing the transmission element disconnected, the tank being indicated in fragmentary form. Fig. 3 is a transverse sectional view of the hanger and mounting, illustrating the manner of interengaging the detachable hanger. Fig. 4 illustrates the guide tube or housing for the intermediate or reciprocatory member with its opposite ends interconnected to enclose and protect the transmission element when such parts are not in use. Figs. 5 and 6 are detail sectional views of the opposite ends of the housing or tubular enclosure for the transmission element, showing the operative connection for engagement with the indicator head and tank unit respectively. Fig. 7 is a detail view of a detachable coupling for engaging the transmission element with the indicator head. Fig. 8 is a modification of the connection shown in Fig. 7. Fig. 9 is a modification of the detachable connection of the actuating rocker and transmission element.

Like parts are indicated by similar characters of reference throughout the several views.

The present form of transmission element and tank unit or float actuated actuator may be employed in conjunction with any suitable type of indicator head. The indicator head comprises a housing 1' within which is mounted an oscillatory drum 2 carrying designations adapted to be seen through a suitable opening in the housing. Adjacent the drum 2 is a pulley 4 to which is secured a chain 3, said chain in turn being connected with a reciprocating transmission element controlled by the actuation of a float in a remotely located tank and hereinafter fully described. The drum 2 is thus connected to the float and any movement of the float upon the rise or fall of the liquid in the tank will be communicated to the drum whereby the operator may readily determine the amount of liquid in the tank. Such indicator head has been shown in the present instance for illustrative purposes only, and it is to be understood that other forms of the indicator may be employed, as for instance, the straight head type of indicator as disclosed in my co-pending application Serial No. 626252 filed Mar. 20, 1923 or the tape winding type of indicator head disclosed in co-pending application Serial No. 626267 filed Mar. 20, 1923.

The tank unit in the present instance embodies a flanged tank plate or head 6 mounted on the top of tank 1 over an opening therein. The tank plate is preferably of elongated rectangular form in which is detachably mounted the hanger member 7. The tank plate or head, or flanged collar 6 includes a cover 6ª, which may be fastened to the head or flanged collar by any suitable securing means (not shown), but adapted to enter suitable openings in the cover and the head, said openings being identified but not illustrated. This hanger member comprises two sheet metal sides or plates 7' interconnected in spaced relation with each other, the upper ends of such plates being more widely separated or flared to conform to the interior of the flanged collar 6. The interior face of the collar flange is provided with notches or spaced recesses 8ª to receive outwardly projecting lugs or ears 8, formed on the upper end of the plates 7'. Pivoted at 9 intermediate the plates 7' is a float arm 10 carrying at its extremity a pivotally mounted buoyant body 11, and having an upwardly extending actuator arm 12. In the present instance for economy of construction the arm 10 and actuator arm 12 have been shown formed integral one with the other of heavy wire or small rod bent upon itself to form at the juncture of said arm a bearing head 13 engaging about the trunnion stud 9. It is obvious that these arms 10 and 12 may be otherwise formed. The actuator arm 12 is provided with a hook 14 at its free end for engagement with an eye 15 in the extremity of an inflexible extension 16, of the intermediate transmission element. This inflexible extension 16 comprising a wire or rod has telescopic engagement in a tubular guide sleeve 17 Fig. 6. This guide sleeve 17 which is preferably a section of inflexible metallic tubing is attached to and forms a continuation of a flexible tubular conduit or protective housing 18, through which extends the flexible reciprocatory transmission wire or strand 19. The protective housing 18 is provided with a covering 34, of any suitable material, and its opposite ends are secured to the respective tubular extensions 20 and 28. This transmission element 19 is connected at one end to an end of the rod 16 by the bushing 16ª (Fig. 6); at its other end the element 19 is detachably connected to the chain 3 by a connector 24, such as is shown in either of Figs. 7 and 8 and explained in detail hereinafter. The chain 3 is wound around the pulley 4 of the indicator head to effect a driving connection therewith as is common in indicators of this type. The connection is such that when the float rises and falls in the tank, the movement is transmitted through the actuator arm 12 to the rod 16 and the transmission element 19 connected with the rod. Such fluctuations are conveyed to the indicator head, by the reciprocatory movement of the transmission wire 19 through its flexible tubular conduit 18, which may be curved as is necessary to reach the desired position of the indicator head. Extending laterally from one end of the flanged head plate 6 is a tubular extension 20 detachably connected with the head plate 6 preferably by screw threading, and having fixed engagement with the tubular conduit 18 at its opposite end. The engagement of this extension 20 with the flexible guide conduit 18 is preferably by means of a clamp collar or bushing 21 screw threaded in the free end of the tubular extension 20 and engaged with the conduit by means of a contracting or clamping nut 22. The clamp collar or bushing 21, at one end, is exteriorly threaded and receives a tunnel plug 21ª, which is carried by the outer covering 34 of the housing 18, the clamping nut 22 cooperating with and enclosing the same to hold it connected to the bushing 21, thereby securing the covering 34 to the collar or bushing 21. The flexible conduit extends a short distance within such tubular extension 20 beyond its point of fixed engagement so that the telescopic guide tube is capable of limited vibratory or oscillatory movement within the tubular extension 20 to accommodate the arcuate movement of the hooked end 14 of the actuator arm 12. The relative size of the tubular extension 20 of the head plate 6 and the guide tube 17 therewithin is such that the rod 16 is incapable of movement to a position where it will disengage the hook 14 of the actuator arm, so long as the tubular extension 20 is connected with the head plate 6.

When it is desired to engage or disengage the motion transmitting element from the tank unit or actuator the tubular extension 20 is disengaged from the head plate 6, and the guide conduit is retracted in relation with the inflexible or wire extension 16 so that said extension 16 extends beyond the end of the tubular member 20 as shown in Fig. 2. The flexible extension rod 16 is connected to the transmission wire 19 in any suitable manner (not shown, but indicated at 16ª). In this relation of parts the clearance between the telescopic member 16 and the interior surface of the tubular extension 20 is sufficient to permit the rod 16 to be turned to an abnormally angular position and shifted laterally sufficient to enable its engagement or disengagement with the hook 14 of the actuator arm. This construction provides a simple method of detachably connecting the actuator arm 12 with the transmission element in such manner that the parts are securely held from accidental disengagement when in use, since they cannot be disengaged without first disengaging the tubular extension 20 from the head plate to afford the necessary clearance and turning the part to abnormal position. At its opposite end the transmission element 19 is detachably connected with the cable or chain 3 of the indicator head. This connection may be of any suitable form and in practice is frequently a split link or a link with overlapping ends. There has been shown in Fig. 7 an enlarged view of a special coupling member by which the indicator and transmission element may be detachably connected for normal operation, but which will automatically release itself in the event that the indicator head becomes locked or that other strain is put upon the apparatus which might break or distort the operating parts thereof. This automatically releasable connection comprises a small tubular sleeve 24 connected to one of the motion transmitting members and a pair of spring arms 23 connected to the other element. The tubular sleeve 24 is provided with lateral openings or recesses 25, while the spring arms 23 are provided with projecting portions 26 engaging in said openings under the tension of the arm. The spring arms 23 are preferably extended somewhat beyond such engaging portion and contact one with the other to not only increase their spring tension but to also facilitate the interengagement of the spring arms with the sleeve. To engage the coupling the free ends of the spring arms are thrust within the tubular sleeve. The engaging portion of the arms form small cams which upon contact with the extremity of the sleeve serve to depress the spring arms one toward the other, against their inherent tension allowing such cam like engaging portions to enter within the sleeve. When such portions register with the recesses or notches 25 the resiliency of the spring arm 23 causes them to project outwardly through such notches to couple the parts in their adjusted relation. It is obvious that so long as the strain upon the parts is normal such engagement will be retained. However, upon subjection to abnormal strain, the camming action of the engaging portion 26 of these arms upon the sides of the notches will operate to retract the arms and release the interengagement. The spring arms 23 are preferably formed from an integral piece of material which is bent upon itself and secured to the end of the transmission wire 19 by crimping as at 19ª. In Fig. 8 there is shown a modification wherein the tubular sleeve is inturned or flanged at its extremity as at 27 for the engagement of the spring arms in lieu of the notches or recesses 25. It is obvious that in lieu of the resiliency of the spring arms 23, the tube 24 may be of resilient material split longitudinally and the arms for engagement therewith may be rigid, so that the tube itself will yield to permit the engagement and disengagement of the arms.

The intermediate motion transmitting element 19 with its tubular guide housing 18 being detachable at its opposite ends from the indicator head and from the tank unit respectively separates the gauge structure into three independent elements. In the construction shown in the drawing the tubular guide housing 18 is provided with an extension 28, by which the housing is detachably connected with the indicator head 1'. This extension 28 is screw threaded or otherwise detachably engaged with the indicator head at one end and at its opposite end has longitudinal or axial adjustment in relation with the tubular guide housing 18 with which it is connected in any relative positions of longitudinal or axial adjustment by means of a clamp or contracting nut 29 screw threaded upon the tapered end of the tubular extension 28 which is longitudinally slotted as at 30 to form yielding or converging tongues contracted into engagement with the tubular guide by the adjustment of the nut 29. The tubular extension 28 having been disconnected from the indicator head and the tubular extension 20 having been disconnected from the flanged head 6, these members are then interconnected one with the other as shown in Fig. 4, to enclose and protect the flexible transmission wire 19 and the extension stem 16. The tube 20 is preferably internally threaded at its extremity for the reception of the end of the tube 28. The delicate transmission wire is thus protected against distortion, kinks or breakage during shipment or when in storage.

In Fig. 9 there is shown a modification of the interconnection between the actuator arm 12 and the telescopic or reciprocatory stem 16' of the transmission member. In such modification the extremity of the actuator arm 12 is provided with an elongated slot 31 in lieu of the hook 14 and the stem 16' of the transmission element is provided with oppositely disposed spaced shoulders 32 in lieu of the eye 15. In this instance, the stem 16' is splined within the guide tube 17', so that while free for reciprocatory movement it must necessarily be rotated with the guide tube 17'. In interconnecting the stem with the arm the guide tube and arm are turned through a quarter rotation to bring the plane of the shoulders 32 into that of the slot 31, through which the terminal shoulders are then thrust and the guide tube and stem rotated in reverse direction through a quarter turn, to the same position shown in the drawing, but with the stop shoulders on opposite sides of the arm. The guide tube 17' is then engaged with the head 6 by any suitable means (not shown) to retain it in such position of rotation. The two tubular extensions 20 and 28, as in Fig. 4, are telescopically united as at 28ª, for the purpose of providing an endless covering for the transmission element 19, while the transmission element and the tubular extensions are not in use, in the manner as illustrated in Fig. 1.

In Fig. 6 there is shown within the guide tube 18 and adjacent to the extremity thereof, a bushing or perforated plug 37 thru which the wire 19 reciprocates. This bushing or perforated plug 37 may be of any suitable material to afford a guide bearing for the reciprocatory wire 19. The plug 37 may with advantage be formed of packing material, which while affording little or no resistance to the movement of the wire 19 effects a wiping action to remove from the wire any moisture or liquid from the tank, which by capillary attraction might tend to follow the wire into the guide tube. A metallic or other guide bushing of non-packing material if conforming sufficiently close to the wire would have the same wiping effect, thus affording a stop member to arrest the progress of the liquid thru the tube.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a liquid level gage, the combination of a float and an intermediate flexible control member with an indicator controlled by the longitudinal movement of the intermediate flexible control member under the influence of the float, characterized by a flanged head plate or collar adapted for mounting on a tank adapted to contain liquid with the level of which the float responds, said flexible control member consisting of a transmission wire connected to the indicator, a flexible covering for the transmission wire, a tubular extension operatively connected to the flanged head plate and in turn to the flexible covering, said flexible covering having an interior portion passing into one end of the tubular extension, a tubular guide sleeve extending into the other end of the tubular extension and operatively connected to the interior portion of the covering, a rod passing into one end of the tubular sleeve and operatively connected to the transmission wire, said flanged head plate having depending spaced walls, an angular member fulcrumed between the depending walls and carrying said float on one end, the other end of the angular member having operative connections with said rod.

2. In a liquid level gage, the combination of a float and an intermediate flexible control member with an indicator controlled by the longitudinal movement of the intermediate flexible control member under the influence of the float, characterized by a flanged head plate adapted for mounting on a tank which is designed to contain liquid to be gaged, said flexible control member including a transmission wire, a covering therefore, the latter being connected to the flanged head plate, said transmisison wire at one end having a rod passing into the head plate, said head plate having a rectangular opening, its opposite walls having recesses, depending spaced parallel walls having means engaging said recesses to support the walls, an angular oscillatory member fulcrumed between the walls and having two arms, one carrying the float, the other operatively connecting with said rod, whereby as the float responds to the liquid level the indicator operates to indicate the amount of liquid in said tank.

3. In a liquid level gage, the combination of a float and an intermediate flexible control member with an indicator controlled by the longitudinal movement of the intermediate flexible control member under the influence of the float, characterized by an oscillatory element carrying said float, with means to operatively support said element on the interior of a tank to contain liquid to be measured, said control member comprising a transmission wire connected at one end to the oscillatory element and at its other end to the indicator, a covering for said transmission wire, said indicator including a casing, means for connecting the covering to the indicator casing, an indicator drum within the indicator casing, a chain in driving connection with the indicator drum, a sleeve connected to one end of the chain, the end of the transmission wire near the indicator terminating in yieldable arms crimped to the end of the wire and having means at their extremities engaging within the sleeve and operatively connecting said yieldable arms to the sleeve.

4. In a liquid level gage, the combination of a float and an intermediate flexible control transmission wire with an indicator controlled by the longitudinal movement of the intermediate flexible control transmission wire under the influence of the float, characterized by opposed yieldable arms crimped to the end of the wire, the indicator including an indicator drum, a chain in driving connection with the drum, a sleeve connected at one end to the chain and in turn receiving said yieldable arms and operatively connecting therewith for detachably connecting the wire to the chain.

In testimony whereof, we have hereunto set our hands this 12th day of March A. D. 1923.

CLIFFORD M. COLE.
WILLIAM S. ADAMS.